(12) United States Patent
Nagata

(10) Patent No.: US 8,971,000 B2
(45) Date of Patent: Mar. 3, 2015

(54) LEAK CURRENT ABSORPTION CIRCUIT, VOLTAGE GENERATING CIRCUIT, POWER SUPPLY APPARATUS, AND VEHICLE

(71) Applicant: Rohm Co., Ltd., Kyoto (JP)

(72) Inventor: Takeshi Nagata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 4 days.

(21) Appl. No.: 13/974,415

(22) Filed: Aug. 23, 2013

(65) Prior Publication Data

US 2014/0063668 A1 Mar. 6, 2014

(30) Foreign Application Priority Data

Aug. 29, 2012 (JP) ................................ 2012-188652

(51) Int. Cl.
- *H02H 9/00* (2006.01)
- *H02H 9/04* (2006.01)
- *H02H 3/08* (2006.01)
- *G05F 1/56* (2006.01)

(52) U.S. Cl.
CPC ... *H02H 3/08* (2013.01); *G05F 1/56* (2013.01)
USPC .......................................... 361/57; 361/91.1

(58) Field of Classification Search
USPC .................................... 361/57, 91.1
See application file for complete search history.

(56) References Cited

U.S. PATENT DOCUMENTS

| | | | | |
|---|---|---|---|---|
| 6,069,782 A * | 5/2000 | Lien et al. | ...................... | 361/111 |
| 6,249,411 B1 * | 6/2001 | Hemena et al. | ............... | 361/91.5 |
| 6,600,356 B1 * | 7/2003 | Weiss | .............................. | 327/310 |
| 7,679,870 B2 * | 3/2010 | Lin et al. | .......................... | 361/56 |
| 7,715,159 B2 * | 5/2010 | Bazzano et al. | ................. | 361/56 |
| 2004/0057172 A1 * | 3/2004 | Sun | ................................ | 361/56 |

FOREIGN PATENT DOCUMENTS

JP 2007-20352 1/2007

* cited by examiner

*Primary Examiner* — Scott Bauer
(74) *Attorney, Agent, or Firm* — Fish & Richardson P.C.

(57) ABSTRACT

A leak current absorption circuit for absorbing a leak current from an output transistor includes a switch connected to a grounding node on one end, a constant voltage circuit connected between the other end of the switch and an output node, a switch-operating circuit connected between the output node and the grounding node to operate the switch based on a voltage of the output node. When the voltage of the output node becomes equal to a predetermined threshold voltage or more, the switch-operating circuit turns on the switch to clamp the voltage of the output node by allowing at least a portion of the leak current from the output transistor flow to the grounding node.

13 Claims, 12 Drawing Sheets

LEAK CURRENT ABSORPTION CIRCUIT, VOLTAGE GENERATING CIRCUIT, POWER SUPPLY APPARATUS, AND VEHICLE

CROSS-REFERENCE TO RELATED APPLICATION

This application is based upon and claims the benefit of priority from Japanese Patent Application No. 2012-188652, filed on Aug. 29, 2012, the entire contents of which are incorporated herein by reference.

TECHNICAL FIELD

The present disclosure relates to a leak current absorption circuit, a voltage generating circuit, a power supply apparatus, and a vehicle.

BACKGROUND

A power supply IC (Integrated Circuit) for supplying a power supply voltage to a load is used in many electronic devices. A synchronous rectifying buck switching regulator is an example of the power supply IC.

The switching regulator includes a switching element, a hysteresis comparator, a light-load detection circuit, and a driver circuit. The hysteresis comparator compares an output voltage of the switching regulator with a first threshold voltage and a second threshold voltage that is lower than the first threshold voltage. The light-load detection circuit determines whether a load connected to the switching regulator is in a light-load state. The driver circuit turns on/off the switching element based on a pulse signal output from the hysteresis comparator.

The hysteresis comparator shifts the second threshold voltage to a higher electrical potential by a predetermined voltage width when the light-load detection circuit determines that the load is in the light-load state. If the light-load detection circuit determines that the load is in the light-load state, the driver circuit stops turning on/off the switching element when the detection voltage reaches the first threshold voltage until the detection voltage falls to the shifted second threshold voltage. Thus, it is possible to reduce ripples of the output voltage when entering the light-load state.

In general, the power supply IC includes an output transistor. A leak current may leak out from the output transistor. For example, the leak current increases when the power supply IC is used under high-temperature circumference, which may influence an operation of a load circuit connected to the power supply IC.

FIG. 12 shows a configuration of a voltage generating circuit 200 of the related art. Referring to FIG. 12, the voltage generating circuit 200 includes an output transistor Tr and a control circuit 50.

The output transistor Tr is a PMOSFET (P-type Metal Oxide Semiconductor Field-Effect Transistor). A source and a drain of the output transistor Tr are electrically connected to a power supply node Vdd and an output node Vout, respectively. The output transistor Tr turns on/off an output of voltage from the power supply node Vdd to the output node Vout, in response to a control signal applied to its gate.

The control circuit 50 includes a comparator 51 and resistors R1 and R2. The resistors R1 and R2 are connected in series and provided between the drain of the output transistor Tr and a grounding node GND. The comparator 51 includes a non-inverting input terminal FB and an inverting input terminal COMP. The non-inverting input terminal FB receives a feedback voltage Vfb from a connection node between the resistor R1 and the resistor R2. The inverting input terminal COMP receives a predetermined reference voltage Vref. The comparator 51 amplifies a difference between the feedback voltage Vfb and the reference voltage Vref to output the control signal. The control signal is applied to the gate of the output transistor Tr.

The leak current leaks out from the drain of the output transistor Tr. A portion of the leak current. i.e., leak current I1 flows through the resistors R1 and R2 to the grounding node GND. Resistance values of the resistors R1 and R2 are set to be extremely large in order to reduce a power consumption of the voltage generating circuit 200. Thus, the voltage across the resistors R1 and R2 becomes large, even when the leak current I1 is relatively small.

The output voltage of the output node Vout is equal to the voltage across the resistors R1 and R2. Therefore, large voltage may be output from the output node Vout, when the leak current I1 increases. More specifically, when the resistance value in a series circuit of the resistors R1 and R2 is 5MΩ, even 1 μA of the leak current I1 causes the output voltage of 5V to be output from the output node Vout. Thus, malfunction of the load circuit (not shown) connected to the output node Vout may be caused. In addition, when a withstand voltage of the load circuit is lower than 5V, the load circuit may be damaged.

SUMMARY

The present disclosure provides some embodiments of a voltage generating circuit that restrain the rise of an output voltage from an output node Vout when a leak current increases.

According to one embodiment of the present disclosure, an output transistor includes a first electrode electrically connected to a power supply node, a second electrode electrically connected to an output node, and a control electrode configured to receive a control signal from a control circuit including a resistor electrically connected between the second electrode of the output transistor and a grounding node to output the control signal to the control electrode of the output transistor based on a voltage across the resistor. A leak current absorption circuit is configured to absorb a leak current leaking from the output transistor. The leak current absorption circuit includes a switch, a constant voltage circuit, and a switch-operating circuit. One end of the switch is electrically connected to the grounding node. The constant voltage circuit is electrically connected between the other end of the switch and the output node to generate a constant voltage. The switch-operating circuit is electrically connected between the output node and the grounding node to operate the switch based on a voltage of the output node. When the voltage of the output node becomes equal to a predetermined threshold voltage or more, the switch-operating circuit turns on the switch to clamp the voltage of the output node by allowing at least a portion of the leak current from the output transistor flow to the grounding node.

In some embodiments, the switch may be a transistor. The switch-operating circuit may be a bias circuit configured to generate a bias voltage for turning on the transistor depending on the voltage of the output node. The transistor is configured to clamp the voltage of the output node to a sum of the constant voltage generated by the constant voltage circuit, the threshold voltage of the transistor and the bias voltage.

In some embodiments, the transistor is a first MOSFET (Metal Oxide Semiconductor Field-Effect Transistor). The bias circuit includes a second MOSFET and a third MOSFET which are depletion type MOSFETs. The second MOSFET and the third MOSFET are connected in series between the output node and the grounding node. A gate of each of the first, second and third MOSFETs is connected to a connection node between the second MOSFET and the third MOSFET.

In some embodiments, the constant voltage circuit includes at least one bipolar transistor that is diode-connected. The at least one bipolar transistor is disposed so that a direction from the output node to the transistor becomes a forward direction.

In some embodiments, the constant voltage circuit includes a Zener diode that is provided so that its cathode is connected to the output node.

According to another embodiment of the present disclosure, a voltage generating circuit for generating an output voltage from an input voltage of a power supply node to output the output voltage via the output node includes an output transistor, a control circuit, and a leak current absorption circuit. A first electrode and a second electrode of the output transistor are electrically connected to the power supply node and the output node, respectively. The output transistor turns on/off an output operation of the output voltage from the power supply node to the output node in response to a control signal to its control electrode. The control circuit includes a resistor electrically connected between the second electrode of the output transistor and a grounding node and outputs the control signal to the control electrode of the output transistor, based on a voltage across the resistor. The leak current absorption circuit is provided between the output node and the grounding node to absorb a leak current leaking from the second electrode of the output transistor. The leak current absorption circuit includes a switch, a constant voltage circuit, and a switch-operating circuit. One end of the switch is electrically connected to the grounding node. The constant voltage circuit is electrically connected between the other end of the switch and the output node to generate a constant voltage. The switch-operating circuit is electrically connected between the output node and the grounding node to operate the switch based on the voltage of the output node. When the voltage of the output node becomes a predetermined threshold voltage or more, the switch-operating circuit turns on the switch to clamp the voltage of the output node by allowing at least a portion of the leak current from the output transistor flow to the grounding node.

In some embodiments, the switch is a transistor. The switch-operating circuit is a bias circuit that generates a bias voltage for turning on the transistor depending on the voltage of the output node. The transistor clamps the voltage of the output node to a sum of the constant voltage generated by the constant voltage circuit and the threshold voltage of the transistor.

In some embodiments, the transistor is a first MOSFET. The bias circuit includes a second MOSFET and a third MOSFET which are depletion-type MOSFETs. The second MOSFET and the third MOSFET are connected in series between the output node and the grounding node. A gate of each of the first, second, and third MOSFETs is connected to a connection node between the second MOSFET and the third MOSFET.

In some embodiments, the constant voltage circuit includes at least one bipolar transistor that is diode-connected and disposed so that a direction from the output node to the transistor becomes a forward direction.

In some embodiments, the constant voltage circuit has a Zener diode that is provided so that its cathode is connected to the output node.

In some embodiments, the voltage generating circuit is formed on a semiconductor substrate.

According to another aspect of the present disclosure, a power supply apparatus includes the above-described voltage generating circuit.

According to still another aspect of the present disclosure, a vehicle includes the above-described voltage generating circuit.

DETAILED DESCRIPTION

Figure 1:
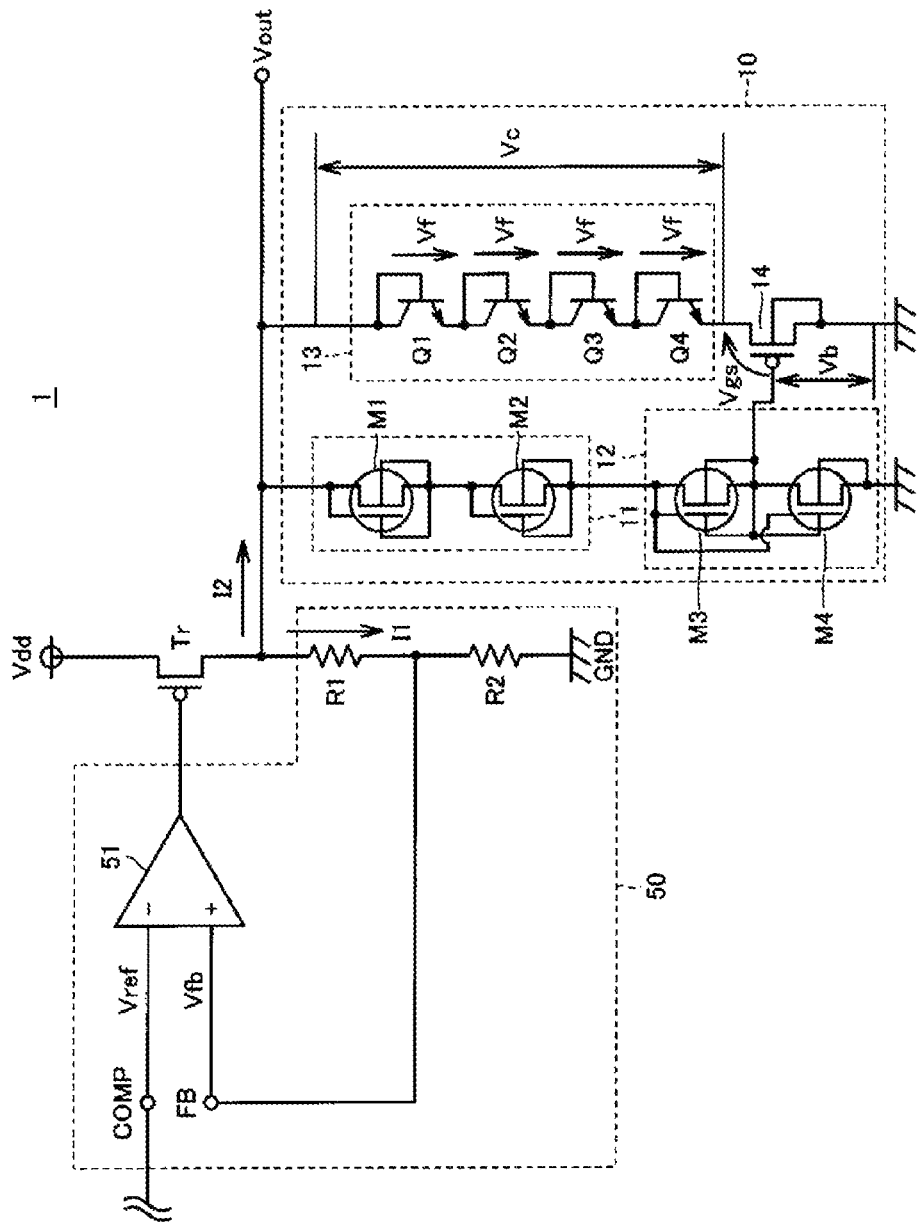
FIG. 1 shows a configuration of a voltage generating circuit according to a first embodiment of the present disclosure.

Hereinafter, embodiments of the present disclosure will be described in detail with reference to the drawings. Same reference numerals will be given to identical or corresponding parts, and description thereof will not be repeated. Further, in the present disclosure, the term "node" refers to a connection point of a plurality of components in an electric circuit and includes wirings or the like electrically connecting the components together.

First Embodiment

FIG. 1 shows a configuration of a voltage generating circuit 1 according to a first embodiment of the present disclosure. With reference to FIG. 1, the voltage generating circuit 1 includes an output transistor Tr, a control circuit 50, and a leak current absorption circuit 10. The voltage generating circuit 1 generates an output voltage of 3.3 V from an input voltage of a power supply node Vdd to output the output voltage via an output node Vout.

The output transistor Tr is a PMOSFET. A source (first electrode) and a drain (second electrode) of the output transistor Tr are electrically connected to the power supply node Vdd and the output node Vout, respectively. In response to a control signal applied to its gate (control electrode), the output transistor Tr turns on/off an output operation of the output voltage from the power supply node Vdd to the output node Vout.

The control circuit 50 includes a comparator 51 and resistors R1 and R2. A series circuit of the resistors R1 and R2 is provided between the drain of the output transistor Tr and a grounding node GND. The comparator 51 includes a non-inverting input terminal FB and an inverting input terminal COMP. The non-inverting input terminal FB receives a feedback voltage Vfb of a connection node connecting the resistor R1 and the resistor R2. The inverting input terminal COMP receives a predetermined reference voltage Vref from the outside of the control circuit 50. The comparator 51 amplifies a difference between the feedback voltage Vfb and the reference voltage Vref to output the control signal. The control signal is applied to the gate of the output transistor Tr.

The reference voltage Vref input to the inverting input terminal COMP is supplied from the outside of the control circuit 50 in FIG. 1. However, the reference voltage Vref may be generated inside the control circuit 50.

The leak current absorbing circuit 10 includes a withstand voltage protection circuit 11, a bias circuit (a switch-operating circuit) 12, a constant voltage circuit 13, and a switch (a transistor or a MOSFET) 14. The leak current absorption circuit 10 is provided for absorbing a leak current leaking from the drain of the output transistor Tr. More specifically, the leak current absorption circuit 10 makes at least a portion of the leak current I2 flow to the grounding node GND.

The withstand voltage protection circuit 11 is provided between the output node Vout and the bias circuit 12. The withstand voltage protection circuit 11 includes transistors M1 and M2. Each of the transistors M1 and M2 is a depletion type NMOSFET (N-type Metal Oxide Semiconductor Field-Effect Transistor). A drain and a source of the transistor M1 are connected to the output node Vout and a drain of the transistor M2, respectively. A source of the transistor M2 is connected to the bias circuit 12. A gate of the transistor M1 is connected to the source of the transistor M1, and a gate of the transistor M2 is connected to the source of the transistor M2. Similarly, a back gate of the transistor M1 is connected to the source of the transistor M1, and a back gate of the transistor M2 is connected to the source of the transistor M2.

The withstand voltage protection circuit 11 is provided for protecting the bias circuit 12 from the voltage of the output node Vout. In other words, when the withstand voltage protection circuit 11 is not provided, the voltage of the output node Vout is entirely applied to the bias circuit 12. Therefore, the bias circuit 12 may be damaged when the voltage of the output node Vout exceeds withstand voltage of the bias circuit 12. When the withstand voltage protection circuit 11 is provided, the voltage of the output node Vout is divided between the withstand voltage protection circuit 11 and the bias circuit 12, according to a ratio of the impedance of the withstand voltage protection circuit 11 and the impedance of the bias circuit 12. Thus, the damage to the bias circuit 12 can be prevented by providing the withstand voltage protection circuit 11 having a suitable impedance.

The withstand voltage protection circuit 11 includes two transistors, but the number of the transistors included in the withstand voltage protection circuit 11 is not limited thereto. The number of the transistors included in the withstand voltage protection circuit 11 is determined appropriately according to the voltage to be divided by the withstand voltage protection circuit 11. Further, when the withstand voltage of the bias circuit 12 is sufficiently large as compared with the rise of the voltage of the output node Vout, the withstand voltage protection circuit 11 may not be provided.

The bias circuit 12 is provided between the withstand voltage protection circuit 11 and the ground node GND. The bias circuit 12 includes transistors M3 and M4. Each of the transistors M3 and M4 is a depletion type NMOSFET. A drain and a source of the transistor M3 are connected to the withstand voltage protection circuit 11 and a drain of the transistor M4, respectively. A source of the transistor M4 is connected to the grounding node GND. A gate of each of transistors M3 and M4 is connected to a connection node connecting the transistor M3 and the transistor M4. A back gate of the transistor M3 is connected to the source of the transistor M3, and a back gate of the transistor M4 is connected to the source of the transistor M4.

The bias circuit 12 operates the switch 14, based on the voltage of the output node Vout. More specifically, the bias circuit 12 generates a bias voltage Vb for turning on the switch 14, depending on the voltage of the output node Vout.

In each of the transistors M1 to M4 included in the withstand voltage protection circuit 11 and the bias circuit 12, the gate and the source are connected. Therefore, each of the transistors M1 to M4 functions as a diode in which a direction from the output node Vout to the grounding node GND may become a forward direction. Therefore, a series circuit of the withstand voltage protection circuit 11 and the bias circuit 12 also has a function of making at least a portion of the leak current I2 flow to the grounding node GND.

The constant voltage circuit 13 is provided between the output node Vout and the source of the switch 14. The constant voltage circuit 13 includes transistors Q1 to Q4.

Each of the transistors Q1 to Q4 is the bipolar transistor. The transistors Q1 to Q4 are connected in series so that an emitter of a transistor may be connected to a collector of an adjacent transistor. Further, each of the transistors Q1 to Q4 is diode-connected. In other words, the collector and a base of each of the transistors Q1 to Q4 are connected. Thus, each of the transistors Q1 to Q4 functions as a diode in which a direction from the output node Vout to the switch 14 may become a forward direction.

The constant voltage circuit 13 generates a constant voltage. The constant voltage corresponds to a voltage drop across the transistors Q1 to Q4.

The constant voltage circuit 13 includes four transistors, but the number of the transistors included in the constant voltage circuit 13 is not limited thereto. How to determine the number of the transistors included in the constant voltage circuit 13 will be described in detail later. Further, a limiting resistor (not shown) for limiting a current value of the leak current may be provided in series with the constant voltage circuit 13 and the switch 14.

The switch 14 is a PMOSFET. A drain (one end) of the switch 14 is connected to the grounding node GND, and a source (the other end) of the switch 14 is connected to the constant voltage circuit 13. The bias voltage Vb generated by the bias circuit 12 is applied to the gate of the switch 14. When a gate-source voltage Vgs with respect to a gate voltage of the switch 14 becomes a predetermined threshold voltage Vth or greater, the switch 14 is turned on.

Each of the transistors M3 and M4 included in the bias circuit 12 is a FET (Field Effect Transistor). The FET has a current supply capability which is lower than that of a bipolar transistor of the same size. Therefore, power consumption of the bias circuit 12 may be reduced in the configuration depicted in FIG. 1, as compared with the case of using the bipolar transistor in place of the transistors M3 and M4. Further, the switch 14 that receives the bias voltage Vb generated by the transistors M3 and M4 may be a voltage-driven type FET.

Hereinafter, operations of the leak current absorption circuit 10 will be described. The leak current leaking from the drain of the output transistor Tr is increased in high temperature environment. The leak current leaking from the drain of the output transistor Tr includes leak current I1 that flows through resistors R1 and R2 to the grounding node GND and leak current I2 that flows to the output node Vout or the leak current absorption circuit 10.

The voltage of the output node Vout is equal to a voltage across the series circuit of the resistors R1 and R2. The voltage across the series circuit is expressed as a product of the leak current I1 and a resistance value (R1+R2). Therefore, the voltage of the output node Vout increases with the increase of the leak current I1.

On the other hand, the voltage of the output node Vout is also expressed as a sum of a constant voltage Vc of the constant voltage circuit 13, the gate-source voltage Vgs of the switch 14, and the bias voltage Vb. The bias voltage Vb has a constant value corresponding to a forward voltage of the transistor M4 which functions as a diode.

The constant voltage Vc corresponds to a voltage drop across the transistors Q1 to Q4. Each of the transistors Q1 to Q4 functions as a diode. The voltage drop across the transistors Q1 to Q4 which are connected in series is equal to four times a forward voltage Vf of each diode (4×Vf). Thus, the constant voltage Vc has a constant value. Therefore, the gate-source voltage Vgs of the switch 14 increases with the increase of the voltage of the output node Vout.

When the gate-source voltage Vgs of the switch 14 becomes the threshold voltage Vth or greater, the switch 14 is turned on. Therefore, the impedance of the leak current absorption circuit 10 becomes lower than that of the series circuit of the resistors R1 and R2. Thus, at least a portion of the leak current I2 flows through the constant voltage circuit 13 and the switch 14 to the grounding node GND. Thus, a ratio of the leak current I2 to the total leak current increases, and a ratio of the leak current I1 to the total leak current decreases. As a result, the rise of the voltage of the output node Vout is restrained.

The voltage of the output node Vout is clamped to a sum of the constant voltage Vc, the threshold voltage Vth, and the bias voltage Vb. The sum is set to be greater than the output voltage (3.3V). Thus, when the output transistor Tr is turned on, the voltage output from the output node Vout may be prevented from being clamped below the predetermined output voltage (3.3V).

More specifically, when an accuracy of the output voltage in the voltage generating circuit 1 is, for example, ±2%, a lower limit of the sum is set to become approximately 3.37V which is 2% greater than 3.3V. On the other hand, an upper limit of the sum is set to be, for example, 4.3V which is 1V greater than 3.3V.

In order to adjust the sum, at least one of the number of the transistors included in the constant voltage circuit 13, the threshold voltage Vth of the gate-source voltage Vgs of the switch 14, and bias voltage Vb is changed. According to this change, the leak current absorption circuit 10 may be applied to an arbitrary voltage generating circuit for outputting an output voltage which is different from 3.3V.

Hereinafter, the effect of the leak current absorption circuit 10 according to the first embodiment will be described in more detail in comparison with a leak current absorption circuit of a first comparative example.

Figure 2:
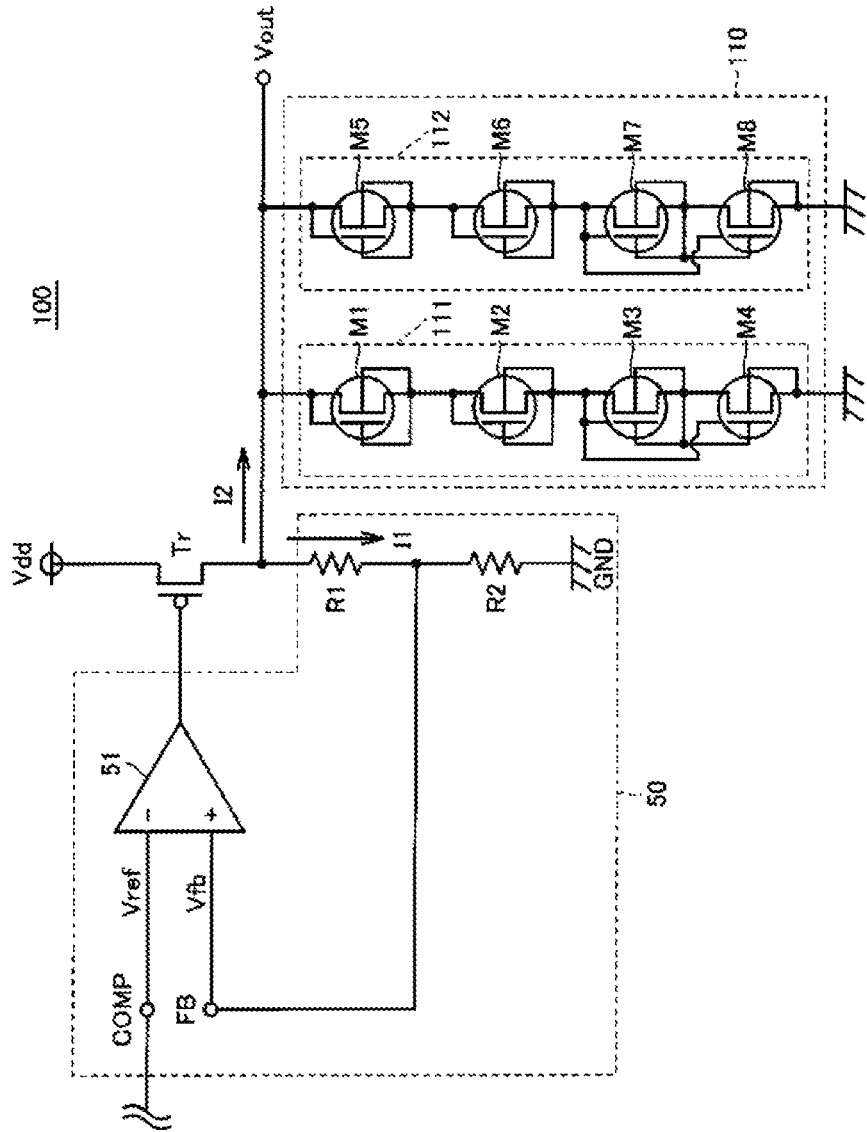
FIG. 2 shows a configuration of a voltage generating circuit including a leak current absorption circuit according to a first comparative example.

FIG. 2 is a diagram showing a configuration of a voltage generating circuit 100 including a leak current absorption circuit 110 according to the first comparative example. With reference to FIG. 2, the leak current absorption circuit 110 according to the first comparative example includes leak current absorption portions 111 and 112. Detailed description regarding other configuration of the voltage generating circuit 100 other than the leak current absorption circuit 110 will not be repeated, since it is equivalent to that of the voltage generating circuit 1 of the first embodiment.

As describe above, the leak current absorption circuit 110 includes the leak current absorption portions 111 and 112. Each of the leak current absorption portions 111 and 112 is provided between the output node Vout and the grounding node GND. The leak current absorption portions 111 and 112 include transistors M1 to M4 and transistors M5 to M8, respectively. Configuration of each of the transistors M1 to M4, and M5 to M8 is equivalent to the configuration of the transistors M1 to M4 included in the withstand voltage protection circuit 11 and the bias circuit 12 according to the first embodiment. As described above, each of the leak current absorption portions 111 and 112 functions as a diode in which a direction from the output node Vout to the grounding node GND becomes a forward direction. Therefore, each of the leak current absorption portions 111 and 112 makes at least a portion of the leak current I2 flow to the grounding node GND.

Figure 3:
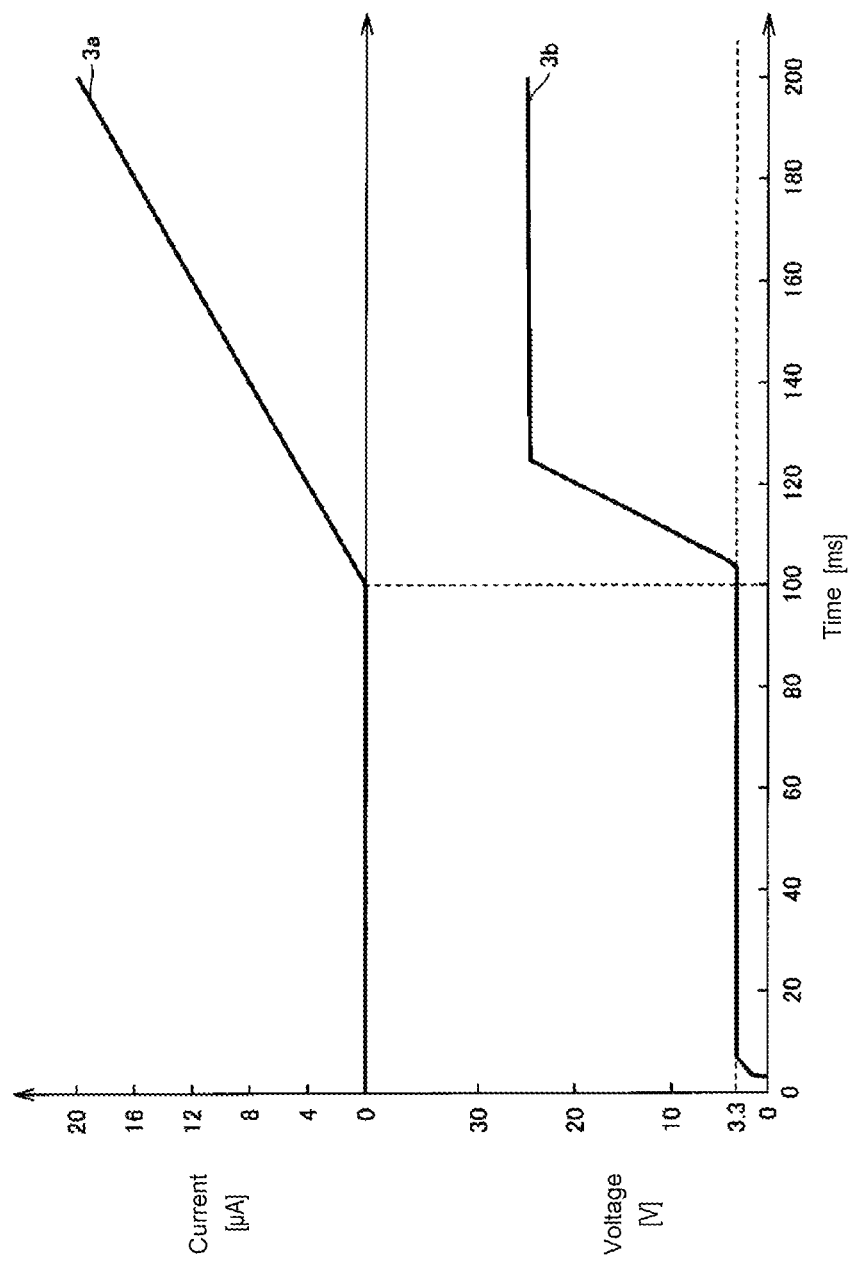
FIG. 3 is a diagram illustrating an output voltage from an output node when a leak current flows through the voltage generating circuit according to the first comparative example.

First, an output voltage from the output node of the voltage generating circuit 100 according to the first comparative example will be described. FIG. 3 shows the output voltage from the output node Vout when the leak current flows in the voltage generating circuit 100 according to the first comparative example. The result is obtained by simulation. With reference to FIG. 3, the horizontal axis is a time axis. The vertical axis represents the current value (waveform 3*a*) of the leak current flowing through the leak current absorption circuit 110 or the voltage value (waveform 3*b*) output from the output node Vout. A reference point at which the simulation is started is 0 ms. In the simulation, the leak current starts to flow in the voltage generating circuit 100 after lapse of 100 ms from the reference point. However, the above-mentioned 100 ms is an example of a simulation condition, which is not limited thereto.

The voltage generating circuit 100 is so controlled that the leak current does not flow until 100 ms elapses from the reference point. At this time, the voltage of the output node Vout is 3.3V.

When 100 ms elapses from the reference point, the leak current starts to flow through the leak current absorption circuit 110. The leak current increases linearly with the elapse of time. At this time, the leak current I1 flowing through the series circuit of the resistors R1 and R2 (see FIG. 2) also increases. Therefore, the voltage of the output node Vout rises rapidly. The voltage of the output node Vout rises to a voltage value between 20V and 30V and remains constant at the voltage value.

The leak current absorption circuit 110 according to the first comparative example has a function of making the leak current flow to the grounding node GND. However, since the leak current absorption circuit 110 has low capability to absorb the leak current, it may not make much leak current flow to the grounding node GND. Thus, the leak current that may not be absorbed in the leak current absorption circuit 110 flows through the series circuit of the resistors R1 and R2. Therefore, the voltage of the output node Vout is increased significantly, which may cause a voltage higher than a withstand voltage of a load circuit (not shown) to be applied to the load circuit, thus damaging the load circuit.

The capability to absorb the leak current that flows to the grounding node GND by the leak current absorption circuit 110 according to the first comparative example is adjusted by the number of the leak current absorption portions. It is possible to increase the ratio of the leak current I2 to the total leak current by increasing the number of the leak current absorption portions. Therefore, the ratio of the leak current I1 to the total leak current becomes smaller, the number of the leak current absorption portions increases, and the rise of the voltage of the output node Vout may be restrained. However, if the number of the leak current absorption portions is increased, the area of the leak current absorption circuit 110 will be increased.

Further, the leak current absorption portions 111 and 112 make a portion of the leak current flow to the grounding node GND, regardless of the voltage of the output node Vout. Therefore, even if the output transistor Tr is turned on, a portion of the leak current that is output from the output transistor Tr flows to the grounding node GND, thereby wasting electrical power.

Figure 4:
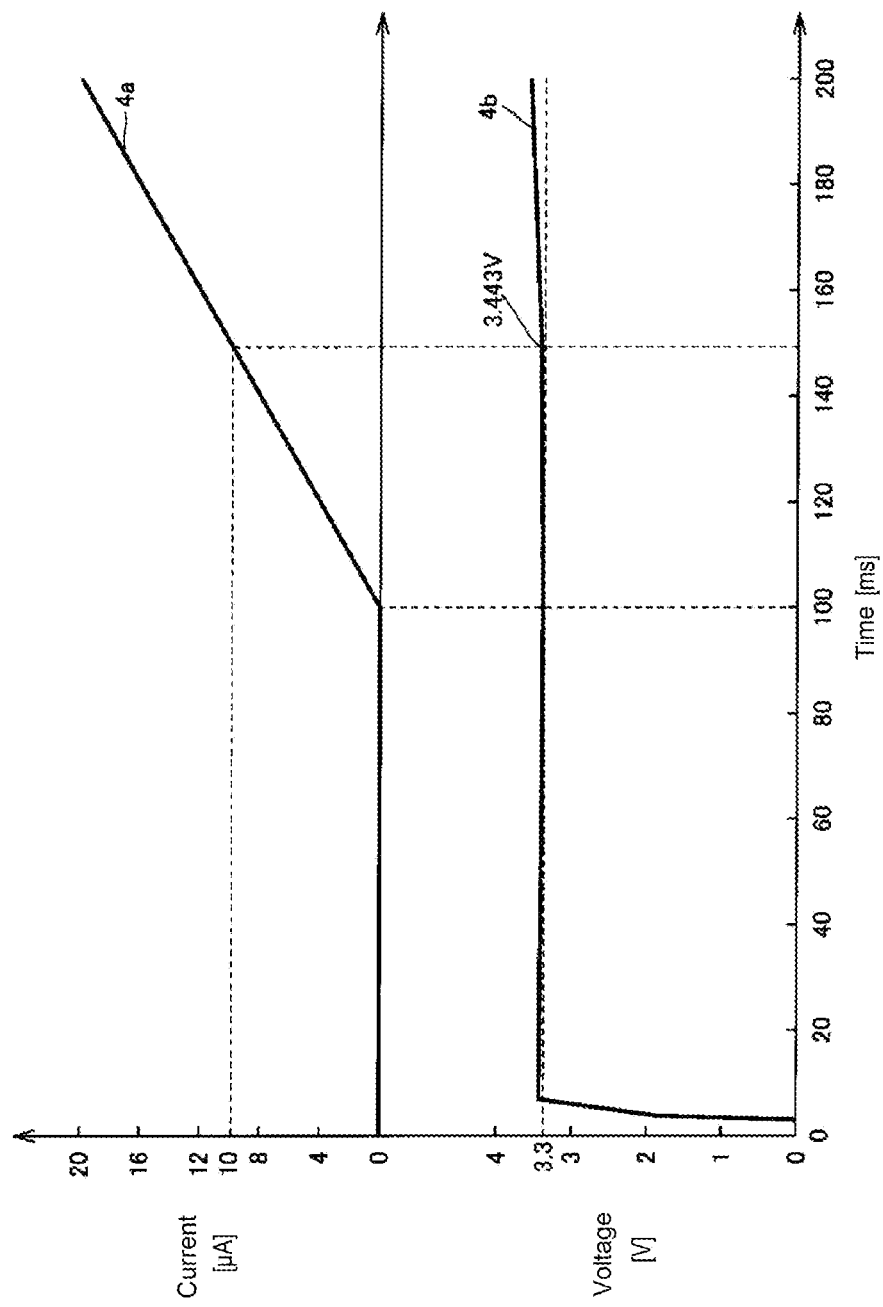
FIG. 4 is a diagram illustrating an output voltage from an output node in the voltage generating circuit shown in FIG. 1.

Subsequently, an output voltage of the output node Vout in the leak current absorption circuit 10 according to the first embodiment will be described. FIG. 4 is a diagram for illustrating the output voltage from the output node Vout in the voltage generating circuit 1 shown in FIG. 1. FIG. 4 is compared with FIG. 3. A waveform 4a indicates the current value of the leak current flowing through the leak current absorption circuit 10 under time variation according to the first embodiment. The output voltage of the output node Vout under time variation is indicated by a waveform 4b.

Since the current value of the leak current and the output voltage of the output node in FIG. 4 are similar to those of the leak current absorption circuit 110 according to the first comparative example shown in FIG. 3 until 100 ms elapses from the reference point, detailed description thereof will not be repeated.

When 100 ms elapses from the reference point, the leak current begins to flow through the leak current absorption circuit 10. The leak current increases linearly, as time elapses. However, the voltage of the output node Vout is rarely increased from 3.3V, regardless of the increase of the leak current. More specifically, the output voltage of the output node Vout becomes 3.443V when the leak current of 10 µA flows through the leak current absorption circuit 10. Thus, it is possible to prevent the voltage exceeding the withstand voltage of a load circuit (not shown) connected to the output node Vout from being applied to and damaging the load circuit.

A plurality of leak current absorption portions are provided in the leak current absorption circuit 110 of the first comparative example in order to increase the capability to absorb the leak current that may be made to flow to the grounding node GND. However, there may be only one of the constant voltage circuit 13 and only one of the switch 14 in the leak current absorption circuit 10 according to the first embodiment. Therefore, the area of the leak current absorption circuit 10 can be reduced.

Further, the leak current absorption circuit 10 according to the first embodiment makes the leak current flow to the grounding node GND when the voltage of the output node Vout becomes a predetermined value which is larger than the output voltage (3.3V). When the output transistor Tr is turned on, the voltage of the output node Vout becomes smaller than the predetermined value. Therefore, when the output transistor Tr is turned on, a portion of the current which is output from the output transistor Tr does not flow to the grounding node GND, thus making it possible to prevent the power from being wasted.

Further, since the switch 14 is the MOSFET, the threshold voltage Vth of the gate-source voltage Vgs has a negative temperature characteristic. Similarly, the voltage drop (4×Vf) (an emitter-collector voltage) across the transistors Q1 to Q4 which are diode-connected also has a negative temperature characteristic. Therefore, the sum of the threshold voltage Vth, the constant voltage Vc, and the bias voltage Vb is decreased in high temperature environment, as compared with room temperature environment. In other words, the voltage to which the leak current absorption circuit 10 clamps the output voltage of the output node Vout is reduced. Therefore, it is possible to clamp the output voltage of the output node Vout reliably so that the output voltage of the output node Vout may not be increased excessively in a high temperature environment. In other words, the output voltage of the output node Vout can be clamped in a stable manner. Thus, the voltage generating circuit 1 according to the first embodiment is suitable for use in a high temperature environment.

The bias circuit 12 includes the transistors M3 and M4 which are MOSFETs. On the other hand, the bias circuit 12 may be configured by, for example, a resistance division circuit including resisters. However, when the bias voltage Vb is generated by the resistance division circuit, bias current flows through the resistors in the resistance division circuit at all times. According to the first embodiment, the bias voltage Vb is applied to the switch 14 using the voltage-driven MOSFETs. Therefore, the bias current can be reduced as compared with the configuration in which the bias voltage Vb is generated by the resistance division circuit. In this manner, it is possible to reduce power consumption of the leak current absorption circuit 10.

The output transistor Tr has been described as being a PMOSFET, but a type of the output transistor Tr is not limited thereto. The output transistor Tr may be, for example, an NMOSFET or a bipolar transistor. The first electrode, the second electrode, and the control electrode of the output transistor Tr may be changed appropriately according to the type of output transistor Tr. For example, when the output transistor Tr is the NMOSFET, a drain thereof corresponds to the first electrode and a source thereof corresponds to the second electrode.

Further, the control circuit 50 has been described with reference to the circuit configuration including the comparator 51, but the circuit configuration of the control circuit 50 is not limited thereto. The control circuit 50 may include a resistor electrically connected between the output transistor Tr and the grounding node GND and output the control signal to the gate of the output transistor Tr based on a voltage across the resistor.

Second Embodiment

The voltage generating circuit 1 according to the first embodiment has been described with reference to an example of the circuit configuration including the leak current absorption circuit 10 that includes the withstand voltage protection circuit 11, the bias circuit 12, the constant voltage circuit 13, and the switch 14, but the circuit configuration of the leak current absorption circuit is not limited thereto. Hereinafter, a voltage generating circuit 2 according to a second embodiment of the present disclosure will be described.

Figure 5:
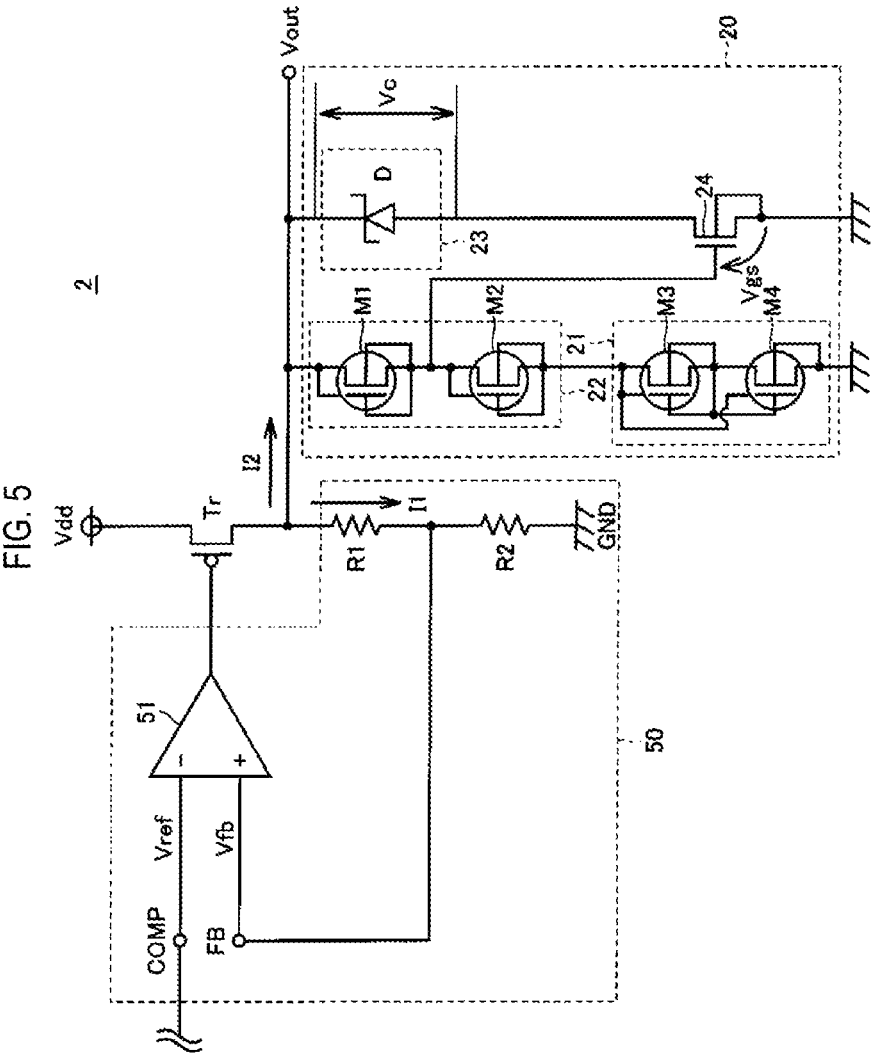
FIG. 5 shows a configuration of a voltage generating circuit according to a second embodiment of the present disclosure.

FIG. 5 shows a configuration of the voltage generating circuit 2 according to the second embodiment of the present disclosure. With reference to FIG. 5, the voltage generating circuit 2 generates an output voltage of 5V from an input voltage of a power supply node Vdd to output the output voltage from an output node Vout.

The voltage generating circuit 2 includes a leak current absorption circuit 20 in place of the leak current absorption circuit 10. The leak current absorption circuit 20 includes a constant voltage circuit 23 in place of the constant voltage circuit 13. Further, the leak current absorption circuit 20 includes a switch 24 in place of the switch 14. Since other configuration of the voltage generating circuit 2 is the same as that of the voltage generating circuit 1, detailed description thereof will not be repeated.

The constant voltage circuit 23 includes a Zener diode D. The Zener diode D is provided so that its cathode is connected to the output node Vout. A constant voltage Vc generated by the constant voltage circuit 23 is equal to a breakdown voltage of the Zener diode D. Therefore, the constant voltage Vc becomes constant.

The switch 24 is an NMOSFET. A source (one end) of the switch 24 is connected to a grounding node GND, and a drain (the other end) of the switch 24 is connected to the constant voltage circuit 23. A voltage of a connection node connecting a transistor M1 and a transistor M2 is applied to a gate of the switch 24. The switch 24 is turned on when a gate-source voltage Vgs relative to a source voltage of the switch 24 becomes a predetermined threshold voltage Vth or more.

Configurations of transistors M1 to M4 are equivalent to those of transistors M1 to M4 according to the first embodiment. However, the transistors M3 and M4 in the leak current absorption circuit 20 function as a withstand voltage protection circuit 21. On the other hand, the transistors M1 and M2 function as a bias circuit 22. In other words, the function of the transistors M1 and M2 and the transistors M3 and M4 as the withstand voltage protection circuit and the bias circuit, respectively, are interchanged as compared with the case of the leak current absorption circuit 10 according to the first embodiment.

Hereinafter, in case of generating the output voltage of 5V, effect of the leak current absorption circuit 20 according to the second embodiment of the present disclosure will be described in comparison with a second comparative example.

The configuration of the voltage generating circuit according to the second comparative example is similar to the configuration of the voltage generating circuit 100 according to the first comparative example shown in FIG. 2. However, the feedback voltage Vfb of the second comparative example is adjusted by changing the resistance value of the resistor R1 in the configuration of the first comparative example shown in FIG. 2. Thus, the voltage generating circuit according to the second comparative example generates the output voltage of 5V.

Figure 6:
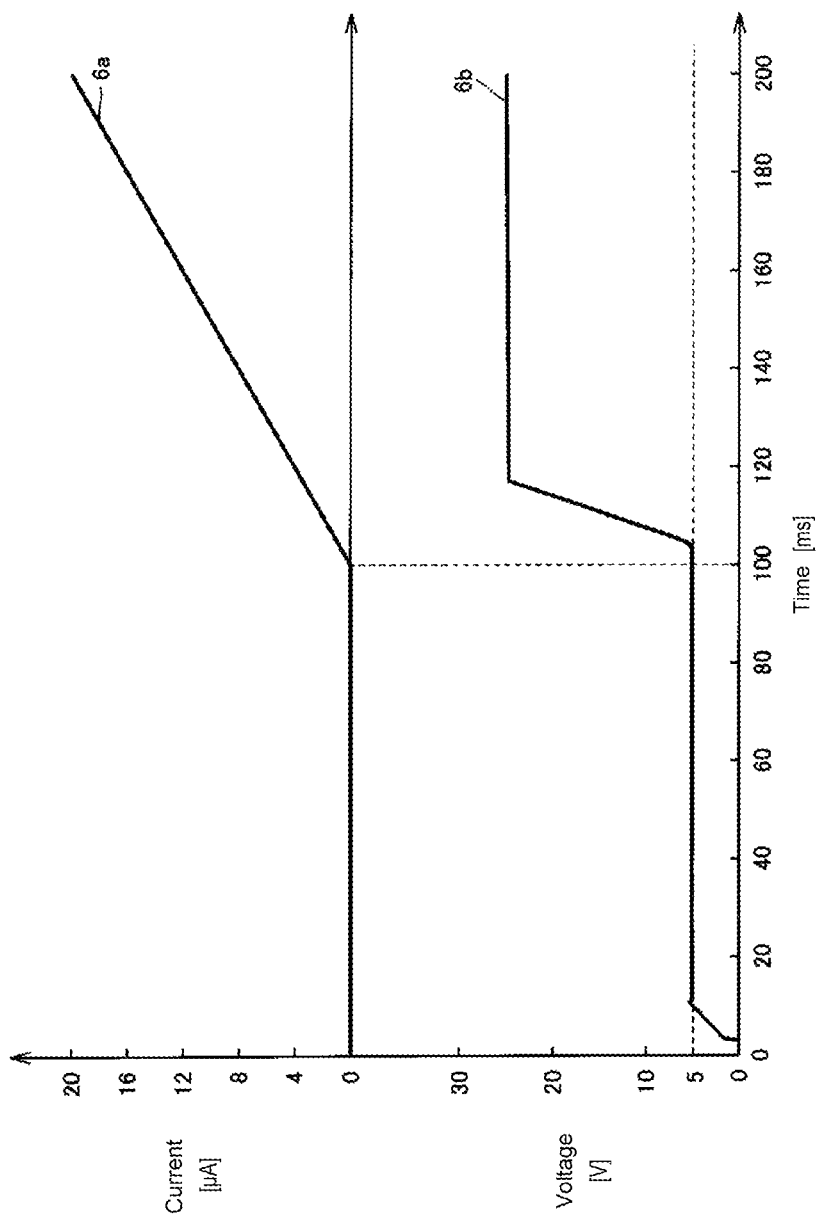
FIG. 6 is a diagram illustrating an output voltage from an output node when a leak current flows through a voltage generating circuit according to a second comparative example.

FIG. 6 shows an output voltage which is output from the output node Vout when the leak current flows through the voltage generating circuit that includes the leak current absorption circuit 110 according to the second comparative example. Waveforms 6a and 6b in FIG. 6 correspond to the waveforms 3a and 3b in FIG. 3, respectively.

Since the current value of the leak current and the output voltage of the output node in FIG. 6 similar to those of the leak current absorption circuit 110 according to the first comparative example shown in FIG. 3 except the output voltage of the output node Vout is 5V until 100 ms elapses from the reference point, detailed description thereof will not be repeated.

When 100 ms elapses from the reference point, the leak current begins to flow through the leak current absorption circuit 110. The leak current increases linearly as time elapses. At this time, the leak current I1 flowing through the series circuit of the resistors R1 and R2 (see FIG. 2) also increases. Therefore, the voltage of the output node Vout rises rapidly. The voltage of the output node Vout rises from 5V to a voltage value between 20V and 30V and remains constant.

Figure 7:
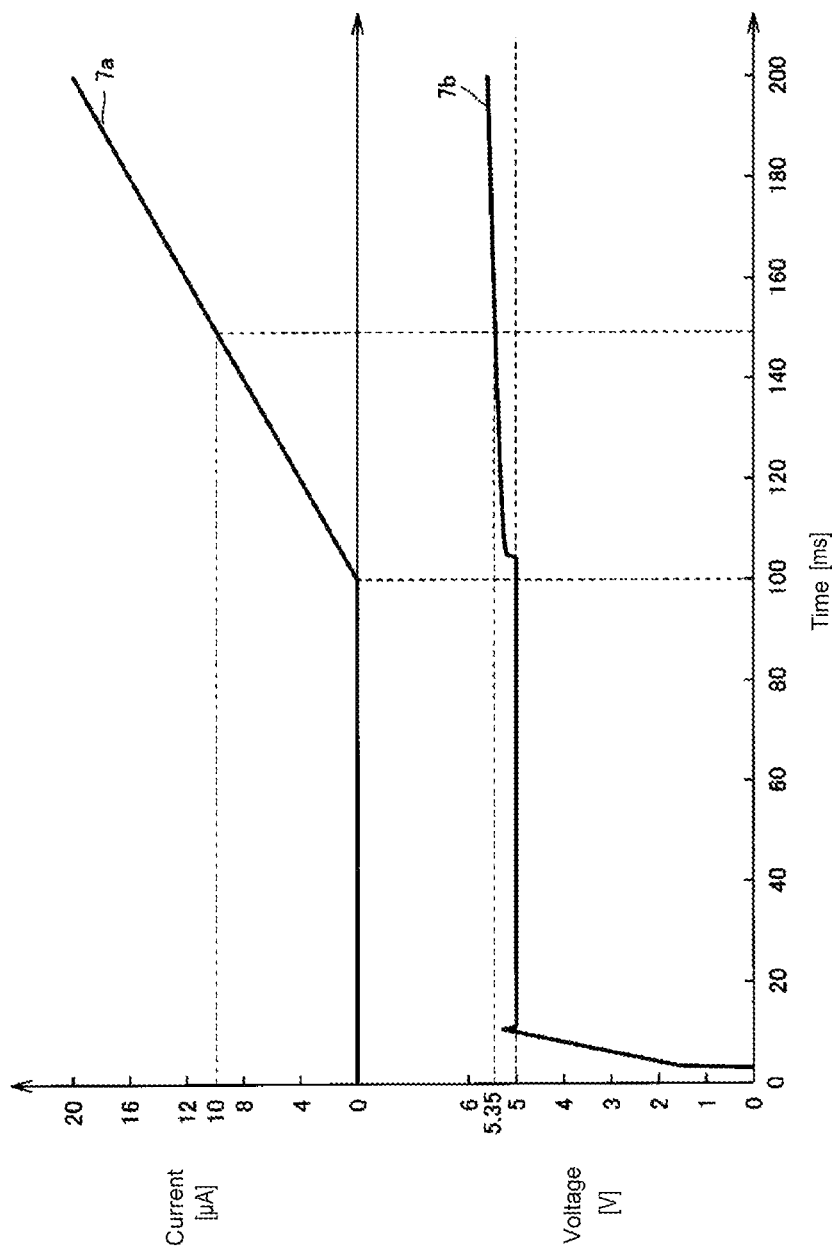
FIG. 7 is diagram illustrating an output voltage from an output node in the voltage generating circuit shown in FIG. 5.

Subsequently, voltage variation of the output node Vout of the voltage generating circuit 2 according to the second embodiment will be described. FIG. 7 is a diagram illustrating an output voltage from the output node Vout in the voltage generating circuit 2 shown in FIG. 5. Waveforms 7a and 7b in FIG. 7 correspond to the waveforms 4a and 4b in FIG. 4, respectively.

Since the current value of the leak current and the output voltage of the output node in FIG. 7 are similar to those of the leak current absorption circuit 110 according to the second comparative example shown in FIG. 6 until 100 ms elapses from the reference point, detailed description thereof will not be repeated.

When 100 ms elapses from the reference point, the leak current begins to flow through the leak current absorption circuit 10. The leak current increases linearly as time elapses. The voltage of the output node Vout rises slightly from 5V. However, the rise is reduced as compared with the case of the leak current absorption circuit 110 according to the second comparative example shown in FIG. 6. More specifically, the voltage of the output node Vout becomes 5.35V when the leak current of 10/LA flows through the leak current absorption circuit 20. In other words, the rise of voltage of the output node Vout is reduced to 0.35V. Thus, it is possible to prevent the voltage exceeding the withstand voltage of a load circuit (not shown) connected to the output node Vout from being applied to and damaging the load circuit. Since other effects are the same as those of the leak current absorption circuit 10 according to the first embodiment, detailed description thereof will not be repeated.

The constant voltage Vc is generated using the diode-connected bipolar transistors Q1 to Q4 in the first embodiment and is generated using the Zener diode D in the second embodiment. However, the constant voltage Vc may be generated using a combination of the bipolar transistors and the Zener diode. The leak current absorption circuit according to the present disclosure may be applied to a voltage generating circuit that generates a variety of output voltages other than 3.3V and 5V by adjusting the number of the diode-connected bipolar transistors, the breakdown voltage of the Zener diode, and the threshold voltage Vth of the gate-source voltage Vgs of the switch appropriately.

Third Embodiment

The voltage generating circuits 1 and 2 according to the first and second embodiments may be implemented using, for example, discrete components. On the other hand, according to a third embodiment, the leak current absorption circuit 10 according to the first embodiment is formed on a semiconductor substrate.

Figure 8:
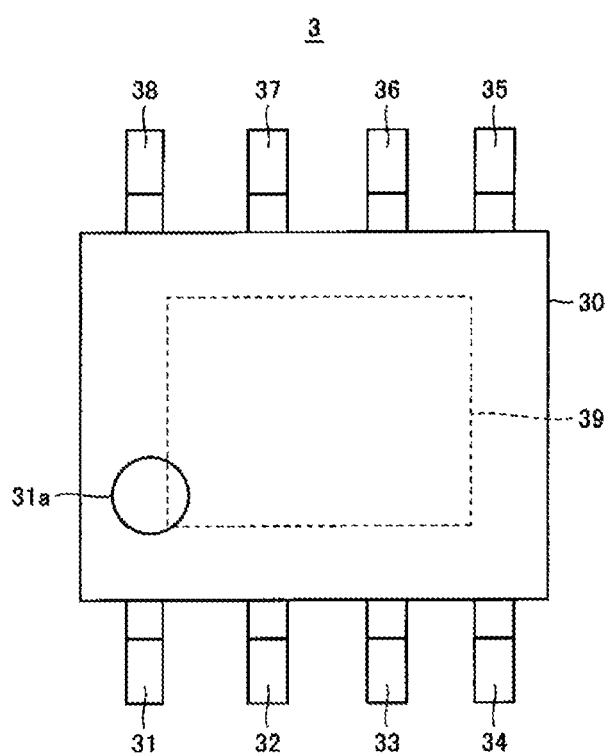
FIG. 8 shows an external view of a power supply IC according to a third embodiment of the present disclosure.

FIG. 8 is an external view of a power supply IC 3 according to the third embodiment of the present disclosure. With reference to FIG. 8, the power supply IC (voltage generating circuit) 3 includes a semiconductor package 30 and terminals 31 through 38. More specifically, the semiconductor package 30 is, for example, a package called HTSOP-J8. The HTSOP-J8 package is an example of the semiconductor package 30, but the type of the semiconductor package 30 is not limited thereto.

The terminals 31 through 38 are produced by processing a lead frame, for example, a copper alloy. The terminals 31 through 38 correspond to #1 pin through #8 pin of the HTSOP-J8 package, respectively. A circular depression 31a indicating a position of #1 pin is provided on a surface of the semiconductor package 30. Further, on a rear surface (mounting surface) of the semiconductor package 30 is provided a heat radiation fin 39 for radiating the heat generated in the semiconductor package 30 to a mounding substrate (not shown) upon which the semiconductor package 30 is mounted.

Figure 9:
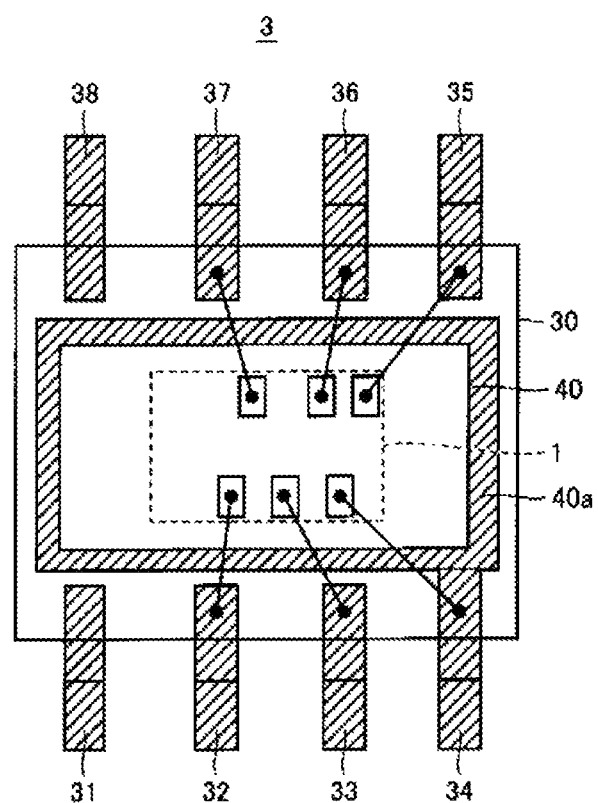
FIG. 9 schematically shows a semiconductor substrate on which a voltage generating circuit is formed and wirings in the power supply IC shown in FIG. 8.

FIG. 9 is a diagram schematically showing a semiconductor substrate 40 upon which the voltage generating circuit 1 is formed and wirings in the semiconductor package 30 shown in FIG. 8. With reference to FIGS. 1 and 9, the semiconductor substrate 40 formed of, for example, silicon and an island 40a connected to the grounding node GND are mounted in the semiconductor package 30. The voltage generating circuit 1 according to the first embodiment is formed on the semiconductor substrate 40.

The terminals 32 through 37 are wire-bonded by the wirings (made of, for example, gold) to corresponding electrodes on the semiconductor substrate 40, respectively. The terminal 32 is the power supply node Vdd which is supplied with the power supply voltage from an external circuit (not shown). The terminal 33 is the output node Vout which outputs the voltage generated by the voltage generating circuit 1 to an external circuit (not shown). The terminal 34 is the grounding node GND connected with the island 40a. The terminals 35 and 36 are connected to the comparator 51 and receive the reference voltage Vref and the feedback voltage Vfb, respectively. The terminal 37 corresponds to an enable (EN) terminal for turning on/off the operation of the voltage generating circuit 1. Since each of the terminals 31 and 38 is an NC (No Connect) terminal, it is not wire-bonded. The semiconductor substrate 40, the island 40a, and each bonding wire are sealed with epoxy resin (not shown).

The semiconductor package 30 shown in FIGS. 8 and 9 has an area of, for example, 6.0 mm×4.9 mm. Using the power supply IC 3 of the third embodiment, a mounting area of the voltage generating circuit 1 may be reduced, as compared to using discrete components in the case of implementing the voltage generating circuits 1 and 2 according to the first and second embodiments. Further, it is possible to reduce cost as well as development time since the number of components is reduced.

Fourth Embodiment

The power supply IC 3 according to the third embodiment may be applied to a variety of applications including, for example, an electronic device such as a mobile phone and a home appliance, a vehicle such as a car, and an industrial equipment such as an FA (Factory Automation) equipment.

Figure 10:
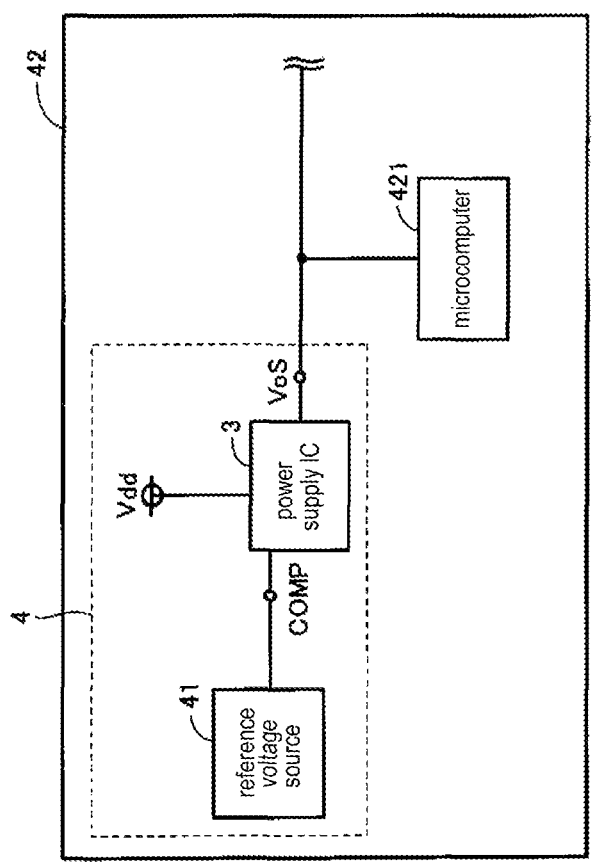
FIG. 10 is a block diagram showing a schematic configuration of an electronic apparatus according to a fourth embodiment of the present disclosure.

FIG. 10 is a block diagram showing a schematic configuration of an electronic apparatus 42 according to the fourth embodiment. With reference to FIG. 10, the electronic apparatus 42 includes a power supply unit 4 and a microcomputer 421. The power supply unit 4 includes a power supply IC 3 and a reference voltage source 41.

The reference voltage source 41 outputs the reference voltage Vref to the inverting input terminal COMP of the comparator 51 (see FIG. 1) included in the power supply IC 3. The power supply IC 3 is supplied with the power supply voltage from the power supply node Vdd to output the output voltage from the output node Vout. The microcomputer 421 is supplied with the output voltage to control the overall operation of the electronic apparatus 42.

In this manner, it is possible to implement the electronic apparatus 42 including the voltage generating circuit 1 which restrain the rise of the voltage output from the output node Vout, when the leak current increases, by applying the power supply IC 3 according to the third embodiment to the electronic apparatus 42. Further, in place of the power supply IC 3 according to the third embodiment, the voltage generating circuits 1 and 2 according to the first and second embodiments may be applied to the electronic apparatus 42. In addition to the electronic apparatus 42, the voltage generating circuits 1 and 2 and the power supply IC 3 may be applied to a vehicle or an industrial equipment.

Figure 11:
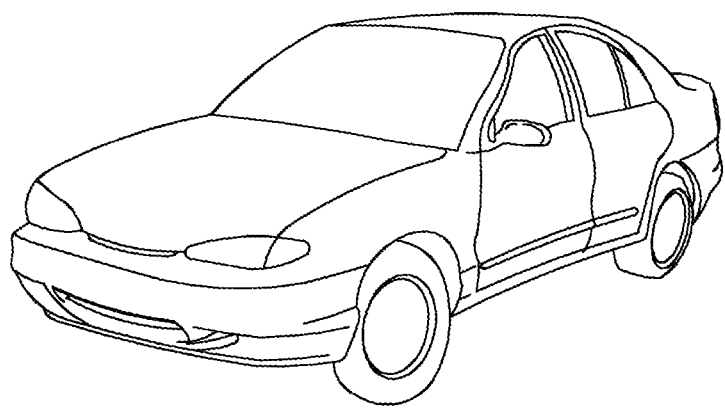
FIG. 11 is a perspective view showing a vehicle including the voltage generating circuit of FIG. 1.
Figure 12:
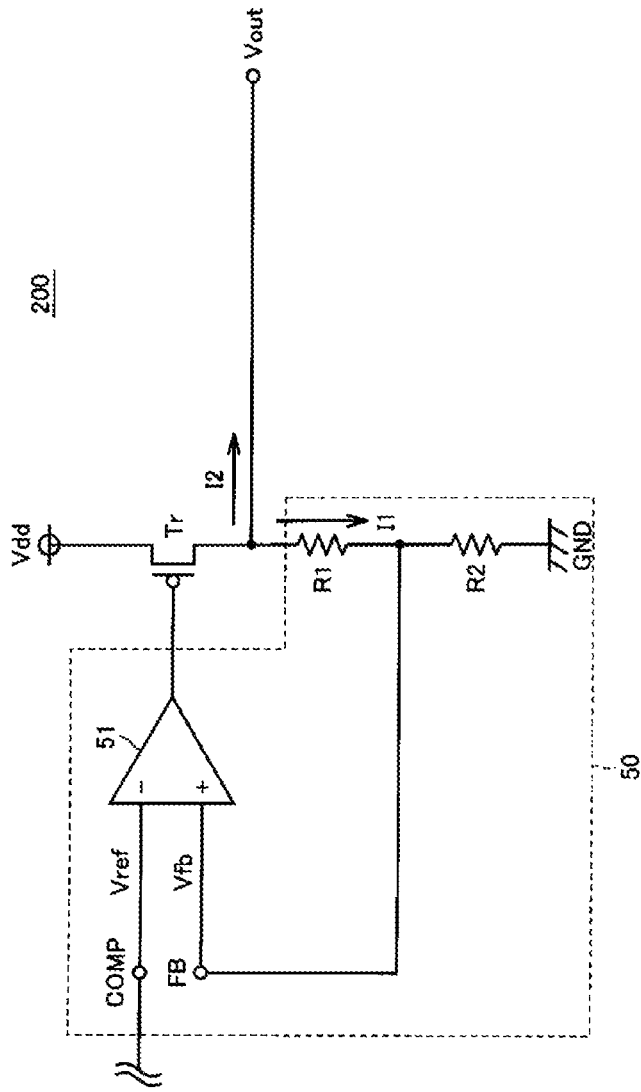
FIG. 12 shows a circuit configuration of a voltage generating circuit of the related art.

FIG. 11 is a perspective view showing a vehicle 300 including the voltage generating circuit of FIG. 1.

According to the present disclosure, it is possible to reduce the rise of the voltage output from the output node when the leak current is increased.

It should be understood that the embodiments disclosed herein are not by way of limitation but only by way of illustration in all respects. The scope of the present disclosure is indicated by the claims rather than the description above, and is intended to include equivalents to the claims, and all changes that fall within the scope of the disclosure.

What is claimed is:

1. A leak current absorption circuit for absorbing a leak current leaking from an output transistor, the output transistor including a first electrode electrically connected to a power supply, a second electrode electrically connected to an output node, and a control electrode configured to receive a control signal from a control circuit, the control circuit including a resistor electrically connected between the second electrode of the output transistor and a grounding node to output the control signal to the control electrode of the output transistor based on a voltage across the resistor, the leak current absorption circuit comprising:

a switch, one end of the switch being electrically connected to the grounding node;

a constant voltage circuit electrically connected between the other end of the switch and the output node to generate a constant voltage; and a switch-operating circuit electrically connected between the output node and the grounding node to operate the switch based on a voltage of the output node;

wherein, when the voltage of the output node becomes equal to a predetermined threshold voltage or more, the switch-operating circuit turns on the switch to clamp the voltage of the output node to allow at least a portion of the leak current from the output transistor flow to the grounding node.

2. The leak current absorption circuit of claim 1, wherein the switch is a transistor, the switch-operating circuit is a bias circuit configured to generate a bias voltage for turning on the transistor depending on the voltage of the output node, and the transistor is configured to clamp the voltage of the output node to a sum of the constant voltage generated by the constant voltage circuit, the threshold voltage of the transistor, and the bias voltage.

3. The leak current absorption circuit of claim 2, wherein the transistor is a first MOSFET (Metal Oxide Semiconductor Field-Effect Transistor), the bias circuit includes a second MOSFET and a third MOSFET which are depletion type MOSFETs, the second MOSFET and the third MOSFET are connected in series between the output node and the grounding node, and a gate of each of the first MOSFET, the second MOSFET, and the third MOSFET is connected to a connection node between the second MOSFET and the third MOSFET.

4. The leak current absorption circuit of claim 2, wherein the constant voltage circuit includes at least one bipolar transistor that is diode-connected and disposed so that a direction from the output node to the transistor becomes a forward direction.

5. The leak current absorption circuit of claim 2, wherein the constant voltage circuit includes a Zener diode provided so that its cathode is connected to the output node.

6. A voltage generating circuit for generating an output voltage from an input voltage of a power supply node to output the output voltage via an output node, the voltage generating circuit comprising:

an output transistor configured to turn on/off an output operation of the output voltage from the power supply node to the output node in response to a control signal applied to its control electrode, a first electrode of the output transistor being electrically connected to the power supply and a second electrode of the output transistor being electrically connected to the output node, a control circuit including a resistor electrically connected between the second electrode of the output transistor and a grounding node to output the control signal to the control electrode of the output transistor based on a voltage across the resistor, and a leak current absorption circuit provided between the output node and the grounding node to absorb a leak current leaking from the second electrode of the output transistor, wherein the leak current absorption circuit comprises:

a switch, one end of the switch being electrically connected to the grounding node;

a constant voltage circuit electrically connected between the other end of the switch and the output node to generate a constant voltage; and a switch-operating circuit electrically connected between the output node and the grounding node to operate the switch based on a voltage of the output node; and wherein, when the voltage of the output node becomes equal to a predetermined threshold voltage or more, the switch-operating circuit turns on the switch to clamp the voltage of the output node to allow at least a portion of the leak current from the output transistor flow to the grounding node.

7. The voltage generating circuit of claim 6, wherein the switch is a transistor, the switch-operating circuit is a bias circuit configured to generate a bias voltage for turning on the transistor depending on the voltage of the output node, and the transistor is configured to clamp the voltage of the output node to a sum of the constant voltage generated by the constant voltage circuit, the threshold voltage of the transistor, and the bias voltage.

8. The voltage generating circuit of claim 7, wherein the transistor is a first MOSFET (Metal Oxide Semiconductor Field-Effect Transistor), the bias circuit includes a second MOSFET and a third MOSFET which are depletion type MOSFETs, the second MOSFET and the third MOSFET are connected in series between the output node and the grounding node, and a gate of each of the first MOSFET, the second MOSFET, and the third MOSFET is connected to a connection node between the second MOSFET and the third MOSFET.

9. The voltage generating circuit of claim 7, wherein the constant voltage circuit includes at least one bipolar transistor that is diode-connected and disposed so that a direction from the output node to the transistor becomes a forward direction.

10. The voltage generating circuit of claim 7, wherein the constant voltage circuit includes a Zener diode provided so that its cathode is connected to the output node.

11. The voltage generating circuit of claim 6, wherein the voltage generating circuit is formed on a semiconductor substrate.

12. A power supply apparatus comprising the voltage generating circuit of claim 6.

13. A vehicle comprising the voltage generating circuit of claim 6.

* * * * *